Sept. 20, 1955　　　　　　　J. NAGY　　　　　　　2,718,426
BLOCK LIFTING AND LOADING APPARATUS
Filed Dec. 8, 1952　　　　　　　　　　　　　　2 Sheets-Sheet 1
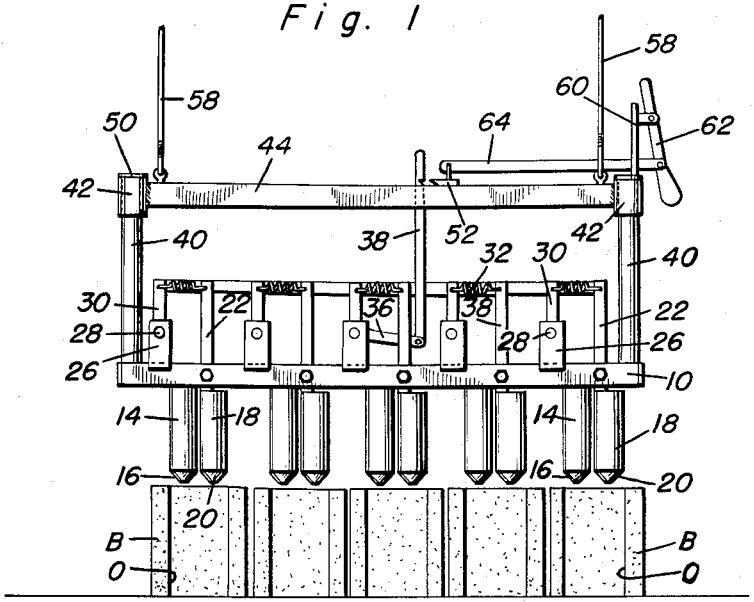
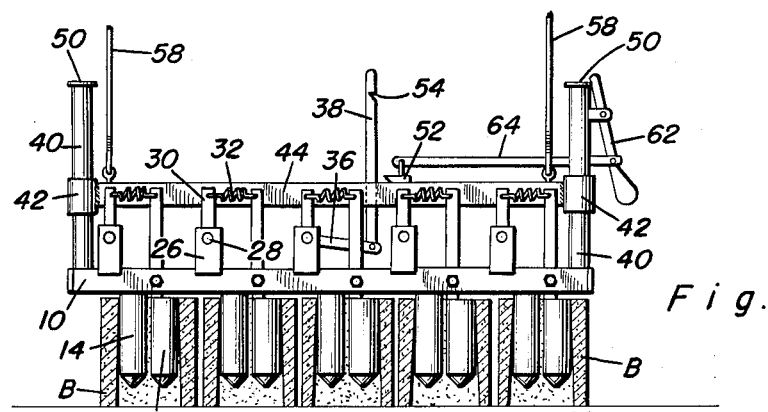
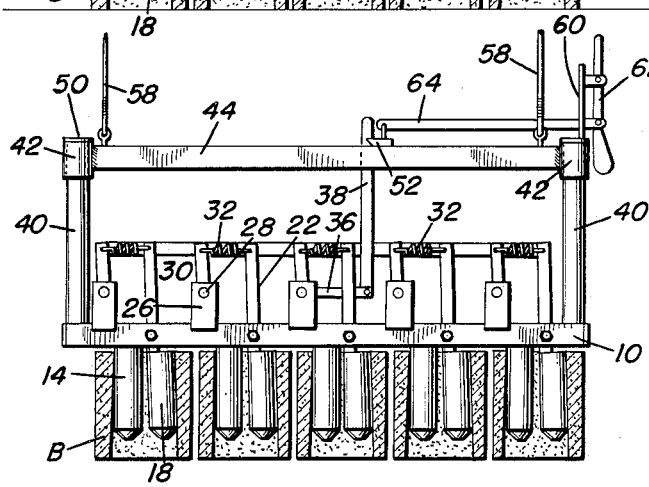
James Nagy
INVENTOR.

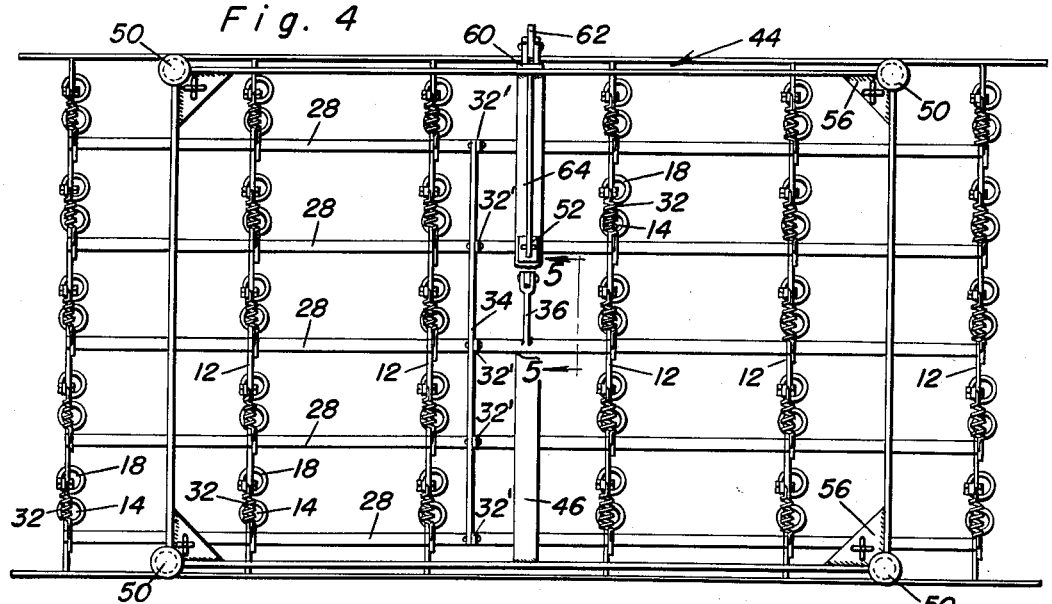
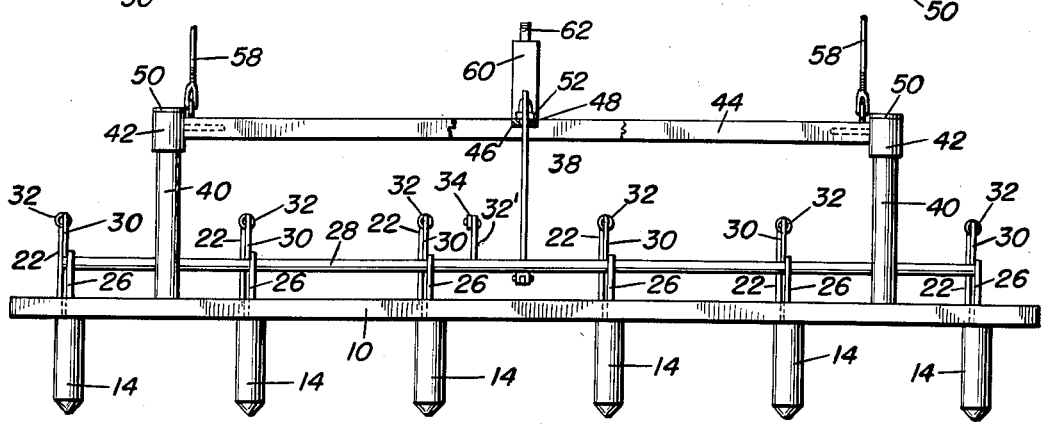
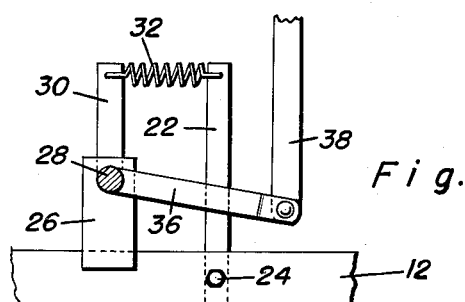
James Nagy
INVENTOR.

United States Patent Office 2,718,426
Patented Sept. 20, 1955

2,718,426
BLOCK LIFTING AND LOADING APPARATUS
James Nagy, Butler, Pa.

Application December 8, 1952, Serial No. 324,709

6 Claims. (Cl. 294—87)

This invention relates to new and useful improvements in block loading apparatus and the primary object of the present invention is to provide a device for engaging, lifting and unloading a plurality of building blocks.

Another important object of the present invention is to provide a block lifting and loading apparatus involving coacting gripper fingers which are inserted into the core of a building block with one of the fingers being spread relative to its companion finger for gripping the walls of the core opening in order that the block may be lifted from a drying rack or the like.

A further object of the present invention is to provide a block lifting and loading apparatus including a hoist mounted frame having stationary and movable fingers mounted thereon with means for moving the movable fingers relative to the fixed fingers whereby the fingers will grip the walls of a core opening in a building block to permit a block to be raised, moved and stacked in a convenient manner.

A still further aim of the present invention is to provide a block lifting and loading apparatus of the aforementioned character that is extremely small and compact in structure, simple and practical in construction, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is an end elevational view of the present invention being lowered into engagement with a plurality of building blocks (shown in section) disposed thereunder;

Figure 2 is a view similar to Figure 1 but showing the gripper fingers moved into the core openings of the blocks;

Figure 3 is a view similar to Figures 1 and 2 but showing the gripper fingers locked within the core openings of the blocks and the blocks being raised with the invention;

Figure 4 is a top plan view of the present invention;

Figure 5 is an enlarged detail vertical sectional view taken substantially on the plane of section line 5—5 of Figure 4; and Figure 6 is a front elevational view of Figure 4 and with part of the frame member broken away for the convenience of explanation.

Referring now to the drawings in detail, wherein for the purpose of illustration, there is disclosed a preferred embodiment of the present invention, the numeral 10 represents a substantially rectangular frame including a plurality of spaced parallel transverse bars 12 each of which supports a plurality of rigid, fixed, vertical fingers or cylindrical gripper bars 14. The upper ends of the fixed fingers 14 are secured by welding or the like to the lower edges of the bars 12 and the lower ends 16 of the fingers 14 are tapered to enter the core openings O of building blocks B.

The bars 12 also pivotally support movable fingers or cylindrical gripper bars 18 having tapered lower ends 20. The upstanding shank portions 22 of the movable fingers 18 are pivotally and removably secured to the bars 12 by fasteners 24 that extend through registering apertures in the bars 12 and shank portions 22. The fingers 14 are arranged in rows and the fingers 18 are also arranged in rows behind the rows of fingers 14 so that each fixed finger 14 will be associated with a movable finger 18 and will coact therewith in gripping a block B as shown in Figure 5.

Bearing forming ears 26 are fixed by welding or the like to the bars 12 and rotatably support rock shafts 28 that extend longitudinally of frame 10 at right angles to the bars 12. Each of the shafts 28 fixedly support a plurality of upstanding longitudinally spaced rigid arms 30 which are located in front of the fingers 18. The arms 30 are connected to the shank portions 22 by coil springs 32 that tend to maintain the portions 22 and 30 parallel and the fingers 18 parallel to the fingers 14.

The shafts 28 each have a rigid ear 32' fixed thereto that extends upwardly from the shafts 28. The ears 32' are disposed one behind the other and are pivoted to a connecting link 34 that extends transversely over the shafts 28, whereby the shafts will rock as a unit. One of the shafts, preferably the centermost of the shafts 28, fixedly supports a substantially horizontally disposed rigid link 36 at its central portion to which there is pivoted an upwardly extending actuating lever 38.

Guide posts 40 are fixed to the frame 10 adjacent the corners thereof and slidably receive collars or sleeves 42 at the reinforced corners of a substantially rectangular, open, frame member 44. The longitudinal rails of the frame member 44 are connected by a cross member or strap 46 having a central slot 48 through which the lever 38 extends. Stops 50 fixed to the upper ends of the posts 40 limit upward sliding movement of the frame member 44 relative to frame 10 or downward sliding movement of the frame 10 relative to the frame member 44.

A locking member or latch 52 is slidably supported upon the strap 46 for entering a notch 54 adjacent the upper end of lever 38 to prevent relative movement between the frame 10 and the frame member 44. The corners of the frame member 44 are reinforced and strengthened by gusset plates 56 to which raising and lowering cables 58 are suitably attached. The cables will be engaged over suitable pulley and/or hoist booms so that the frame 10 and frame member can be lowered, raised, and moved to a desired area for loading and unloading building blocks while the frame and frame members are maintained in a horizontal position.

A support 60 is fixed to and extends upwardly from the frame member 44. This support pivotally supports a vertically swingable handle 62 that is connected to latch 52 by a pitman 64 so that as the handle 62 is raised, the latch 52 will be retracted from lever 38 to permit relative movement between frame 10 and frame member 44.

In practical use of the present invention, the frame member 44 and frame 10 are lowered or moved over a plurality of building blocks B as shown in Figure 1. Then, the handle 62 is swung upwardly to release latch 52 from latch 54 so that as frame member 44 and frame 10 are lowered the fingers 18 may swing toward the fingers 14 to extend into the core openings O of the blocks B as illustrated in Figure 1.

After the fingers 14 and 18 are engaged within the core openings O of the blocks B, the frame member 44 is raised by the cables 58 until the latch 52 is again engaged in the notch 54. Continued upward pull upon the frame member 44 by the cables 58 will raise the links 36 and impart rotation to the rock shafts 28 for expanding the springs 32 and causing the fingers 18 to be yieldingly urged against the walls of the core openings O, it being noted that the latch 52 will engage within the notch 54 before the sleeves 42 engage stops 50 so that the lever 38 will be pulled upwardly as the frame member 44 is raised by the cables 58.

After the apparatus has been moved to a desired area for unloading of the blocks B, the frame member 44 and frame 10 are lowered by the cables 58 and the latch 52 is retracted so the fingers 18 can move toward the fingers 14 in releasing the blocks previously gripped thereby.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. An apparatus for lifting and stacking building blocks having core openings, said apparatus comprising a frame, rows of rigid vertical fingers fixed to and depending from said frame, rows of swingable fingers pivotally carried by the frame and arranged in pairs with the fixed fingers for pivotal movement toward and away from said fixed fingers, means yieldingly urging the movable fingers parallel to the fixed fingers, pivoting means operatively connected to the movable fingers for simultaneously pivoting the movable fingers away from their associated fixed fingers, and means engaging the pivoting means for permitting the pivoting means to urge movement of the movable fingers away from the fixed fingers upon raising of said frame.

2. An apparatus for lifting and stacking building blocks having core openings, said apparatus comprising a frame having a plurality of spaced parallel longitudinal bars, a plurality of longitudinally spaced rigid vertical fingers fixed to and depending from each bar, a plurality of spaced parallel longitudinal rockshafts rotatably supported on the frame, a plurality of swingable movable fingers pivoted to each bar and arranged in pairs with said fixed fingers, arms fixed to said shafts, there being one arm behind each movable finger, coil springs connecting the arms to the movable fingers to maintain the latter parallel to the fixed fingers, and means connected to the shafts for rotating the shafts to swing the arms from their associated movable fingers to incline the movable fingers relative to the fixed fingers.

3. An apparatus for lifting and stacking building blocks having core openings, said apparatus comprising a frame having a plurality of spaced parallel longitudinal bars, a plurality of longitudinally spaced rigid vertical fingers fixed to and depending from each bar, a plurality of spaced parallel longitudinal rockshafts rotatably supported on the frame, a plurality of swingable movable fingers pivoted to each bar and arranged in pairs with said fixed fingers, arms fixed to said shafts, there being one arm behind each movable finger, coil springs connecting the arms to the movable fingers to maintain the latter parallel to the fixed fingers, a link connecting said shafts together so that they will rock as a unit, and means connected to one of the shafts for rocking the shafts.

4. An apparatus for lifting and stacking building blocks having core openings, said apparatus comprising a frame having a plurality of spaced parallel longitudinal bars, a plurality of longitudinally spaced rigid vertical fingers fixed to and depending from each bar, a plurality of spaced parallel longitudinal rockshafts rotatably supported on the frame, a plurality of swingable movable fingers pivoted to each bar and arranged in pairs with said fixed fingers, arms fixed to said shafts, there being one arm behind each movable finger, coil springs connecting the arms to the movable fingers to maintain the latter parallel to the fixed fingers, a link connecting said shafts together so that they will rock as a unit, and means connected to one of the shafts for rocking the shafts, a link connecting said shafts together so that they will rock as a unit, and means connected to one of the shafts for rocking the shafts.

5. An apparatus for lifting and stacking building blocks having core openings, said apparatus comprising a frame having a plurality of spaced parallel longitudinal bars, a plurality of longitudinally spaced rigid vertical fingers fixed to and depending from each bar, a plurality of spaced parallel longitudinal rockshafts rotatably supported on the frame, a plurality of swingable movable fingers pivoted to each bar and arranged in pairs with said fixed fingers, arms fixed to said shafts, there being one arm behind each movable finger, coil springs connecting the arms to the movable fingers to maintain the latter parallel to the fixed fingers, a link connecting said shafts so that the shafts will rock as a unit, a lever engaged with one of the shafts and extending upwardly therefrom to permit the shafts to be rocked, posts rising from the frame, a frame member overlying the frame and slidably engaged with the posts, and latch means carried by the frame member engaging the lever to retain the shafts rocked with the movable fingers inclined relative to the fixed fingers.

6. The combination of claim 5 and lift cables attached to frame member for selectively raising and lowering the frame members, and stops at the upper ends of the posts engaging the frame member to limit upward movement of the frame member relative to the frame and downward movement of the frame relative to the frame member.

References Cited in the file of this patent

UNITED STATES PATENTS

| | | |
|---|---|---|
| 879,801 | Swanson | Feb. 18, 1908 |
| 962,362 | Lang | June 21, 1910 |
| 1,734,807 | Herman | Nov. 5, 1929 |
| 2,578,072 | Kargol | Dec. 11, 1951 |